United States Patent
Ehrenberg

(10) Patent No.: US 8,442,454 B1
(45) Date of Patent: May 14, 2013

(54) TACTICAL COMMUNICATION SYSTEM

(76) Inventor: Stuart H. Ehrenberg, Shenandoah Junction, WV (US)

(*) Notice: Subject to any disclaimer, the term of this patent is extended or adjusted under 35 U.S.C. 154(b) by 765 days.

(21) Appl. No.: 12/545,414

(22) Filed: Aug. 21, 2009

Related U.S. Application Data

(60) Provisional application No. 61/136,256, filed on Aug. 22, 2008.

(51) Int. Cl.
*H04B 1/38* (2006.01)

(52) U.S. Cl.
USPC .......................................... 455/90.3

(58) Field of Classification Search .......... 455/90.3, 455/572–575.5, 127.5, 128, 343.5–343.6, 455/347, 106, 300–301
See application file for complete search history.

(56) References Cited

U.S. PATENT DOCUMENTS

| | | | |
|---|---|---|---|
| 3,745,466 A * | 7/1973 | Pisano | 455/128 |
| 6,041,242 A * | 3/2000 | Coulthard | 455/575.1 |
| 6,459,176 B1 * | 10/2002 | Brockel et al. | 307/150 |
| 6,626,264 B1 * | 9/2003 | Christen | 181/290 |
| 6,967,280 B1 * | 11/2005 | Boatwright et al. | 174/377 |
| 7,040,491 B1 * | 5/2006 | Claprood et al. | 211/26 |
| 2005/0208904 A1 * | 9/2005 | Sit et al. | 455/90.3 |
| 2006/0084397 A1 * | 4/2006 | Turner et al. | 455/117 |
| 2007/0142103 A1 * | 6/2007 | Livne | 455/575.5 |
| 2008/0268924 A1 * | 10/2008 | Chang | 455/575.5 |
| 2011/0130177 A1 * | 6/2011 | Halliday | 455/575.1 |

* cited by examiner

*Primary Examiner* — Andrew Wendell
*Assistant Examiner* — David Bilodeau
(74) *Attorney, Agent, or Firm* — Snyder, Clark, Lesch & Chung, LLP

(57) ABSTRACT

A system includes radio communications equipment that is configured to transmit and receive communications over a number of different frequencies. The system also includes a battery configured to supply power to the radio and a power generation system configured to charge the battery. The system may further include a portable electromagnetically shielded container configured to house the radio, the battery and the power generation system and provide protection from electromagnetic radiation related damage.

21 Claims, 11 Drawing Sheets

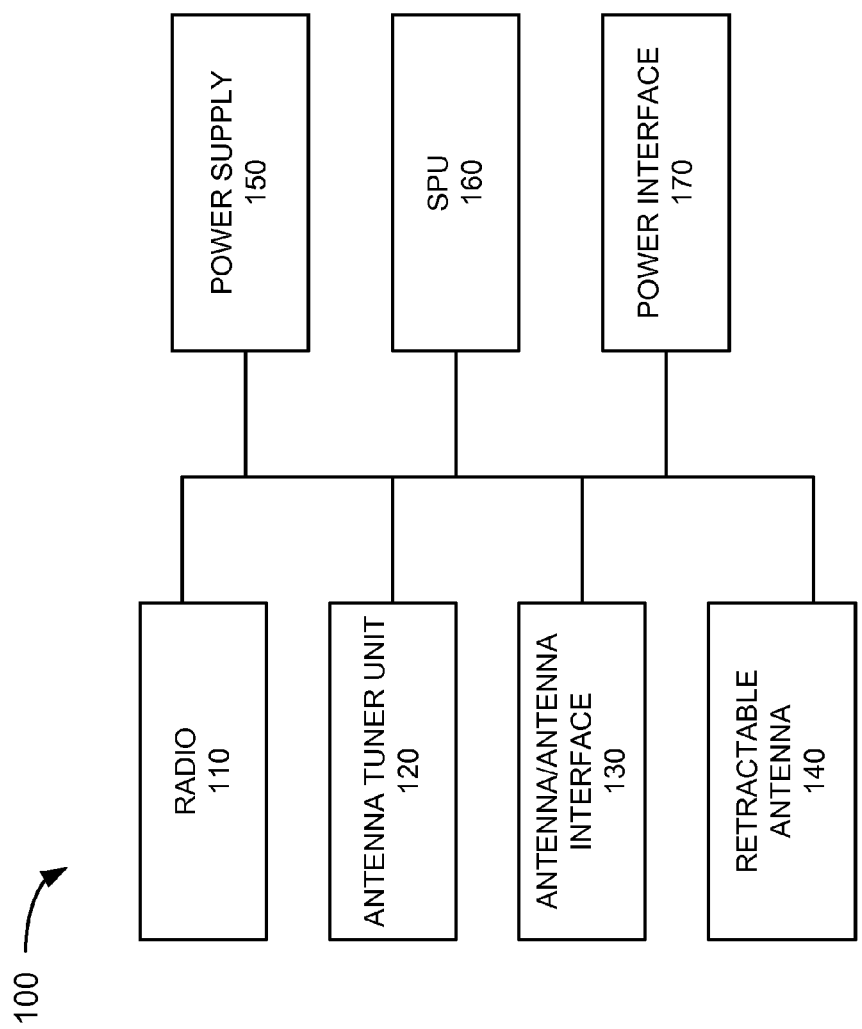

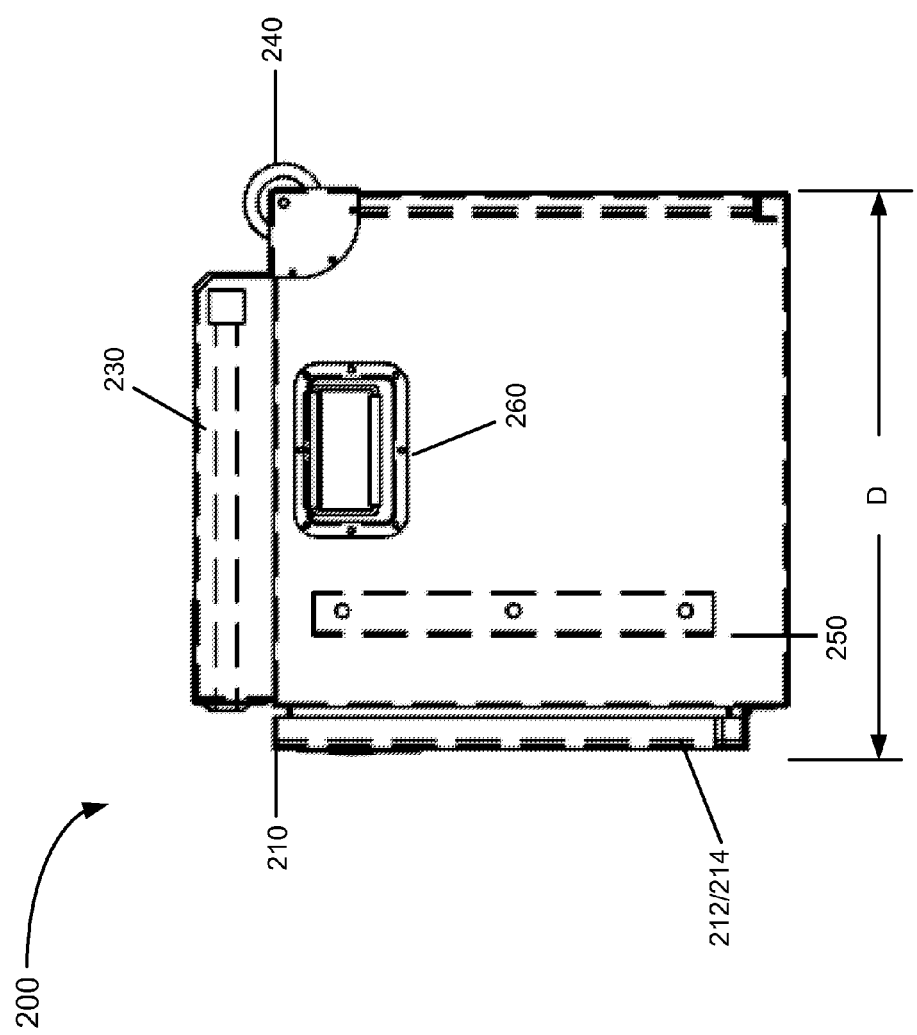

TACTICAL COMMUNICATION SYSTEM

RELATED APPLICATION

This application claims priority under 35 U.S.C. §119 based on U.S. Provisional Patent Application. No. 61/136,256 filed Aug. 22, 2008, entitled "Tactical Communication System," the disclosure of which is hereby incorporated herein by reference.

BACKGROUND INFORMATION

Within the field of information technology, disaster recovery is often overlooked when designing systems and/or networks that may be needed after a disaster occurs. For example, the primary focus in the disaster recovery field has been in the area of providing back up for large computer systems and the network infrastructure that supports them, while less focus has been given to communication systems.

In disaster situations, such as tsunamis, hurricanes and earthquakes, many communication systems and much of the communications infrastructure (e.g., cell towers, telecommunication networking and switching systems, the electrical power grid, etc.) are wiped out. Such communication systems and/or infrastructure are critical to various public authorities/agencies to enable these authorities/agencies to continue to perform their jobs and maintain order after the disaster occurs. As a result, when a disaster occurs, various authorities/agencies are unable to effectively communicate and perform their jobs.

In addition, in the emergency communications industry, little to no attention has been given to protecting communication systems/infrastructure from the effects of Electromagnetic pulse (EMP) attacks. As a result, existing communication systems/infrastructure are vulnerable to EMP attacks. An EMP attack may involve nuclear or non-nuclear weapons which create a large electromagnetic pulse. Other causes of EMP may include solar eruptions, such as solar flares or coronal mass ejections (CME).

BRIEF DESCRIPTION OF THE DRAWINGS

FIG. 1 is a functional block diagram of exemplary components included in an exemplary communication system consistent with embodiments of the invention;

FIGS. 2A-2G illustrate views of an exemplary container or case in which the components of FIG. 1 may be housed;

DETAILED DESCRIPTION OF PREFERRED EMBODIMENTS

Figure 2A:
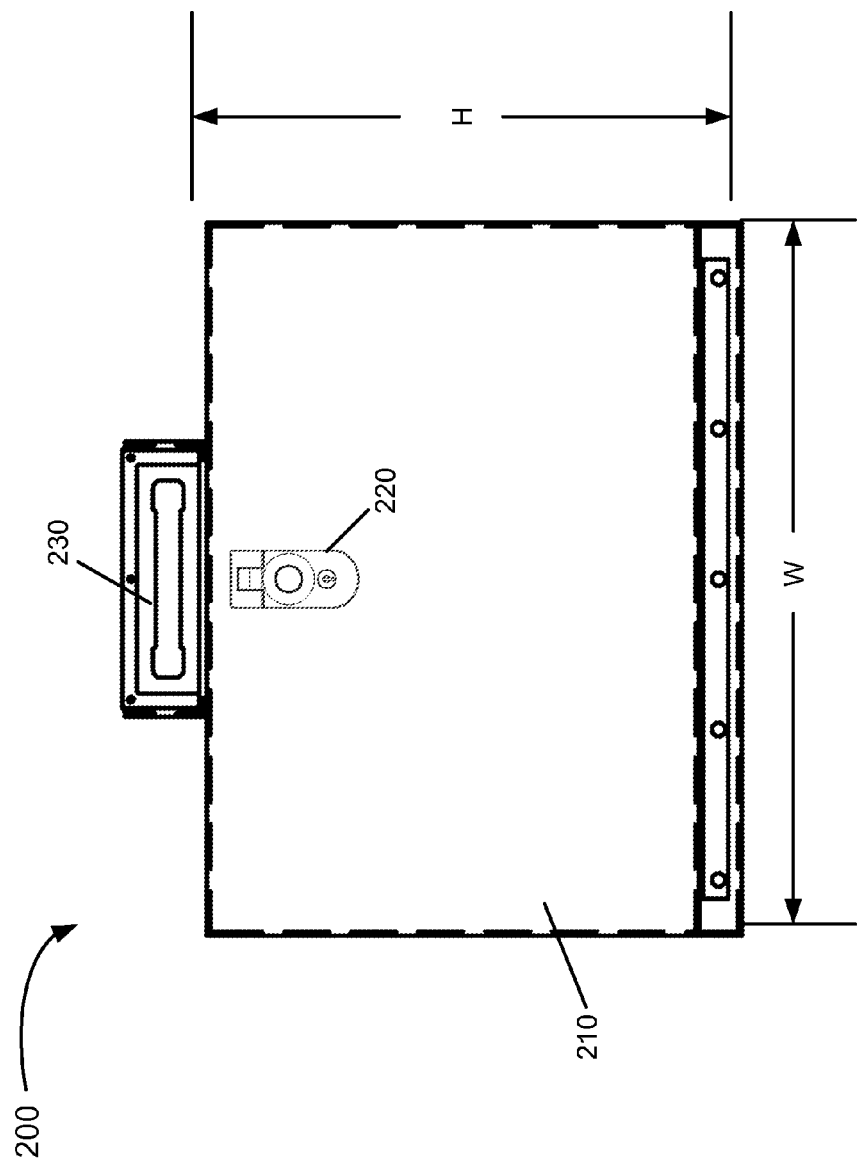

The following detailed description refers to the accompanying drawings. The same reference numbers in different drawings may identify the same or similar elements. Also, the following detailed description does not limit the invention.

Implementations described herein relate to a communication system that may be used to provide communications in disaster situations or in other scenarios where a conventional communication system or infrastructure is experiencing problems or has failed. In one exemplary implementation, a tactical communication system may be provided in a portable container that ensures that an operator will have communications capabilities in virtually any situation, including scenarios where the power grid and/or communications infrastructure, such as cell towers, are damaged and/or are unavailable. In addition, in an exemplary implementation, the tactical communication system may provide the communication system components with protection from EMP attacks or surges caused by, for example, close proximity lightning strikes.

FIG. 1 is an exemplary functional block diagram of a tactical communications system (TCS) 100 consistent with embodiments describe herein. Referring to FIG. 1, TCS 100 may include a radio 110, an antenna tuner unit (ATU) 120, an antenna/antenna interface 130, a retractable antenna 140, a power supply 150, a self-contained power unit (SPU) 160 and a power interface 170. The configuration illustrated in FIG. 1 is exemplary only. It should be understood that in alternative implementations, TCS 100 may include additional, fewer or different components.

TCS 100 acts as a hub or the heart of a communication system that provides robust communications capability in the event of a disaster or a communications system failure. TCS 100 may also be expandable based on a user's preferences. For example, TCS 100 may include "hooks" or connection points for supporting additional add-on functionality, as described in detail below. In addition, in some implementations, the components illustrated in FIG. 1 may be included in an EMP protected container, as also described in detail below.

Referring back to FIG. 1, radio 110, also referred to herein as comprehensive communications package (CCP) 110, may include a transceiver that is able to transmit and receive radio signals via high frequency (HF), very high frequency (VHF) and/or ultra high frequency (UHF), with spectrum capability (transmit and receive) ranging from, for example, approximately 2-30 megahertz (MHz), 118-170 MHz and 440-470 MHz respectively. In other implementations, the radio 110, or in some implementations, multiple radios 110, may be configured to communicate in other frequency bands.

Antenna Tuner Unit (ATU) 120 may include a tuner capable of automatically tuning the antenna being used by TCS 100 whenever the user changes frequencies. In an exemplary implementation, ATU 120 uses switching relays and other components that draw current from power supply 150 and/or SPU 160 only when ATU 120 is actively tuning. This may help reduce overall power consumption and provide an efficient current draw from the power source.

Antenna/antenna interface 130 may include one or more antennas and interfaces for connecting an antenna to TCS 100. For example, antenna/antenna interface 130 may include a HF antenna, a VHF antenna and/or a UHF antenna capable of transmitting and receiving efficiently on the HF, VHF and UHF frequency bands, respectively. Antenna/antenna interface 130 may also include connections ports located on TCS 100 (e.g., on a back portion of TCS 100) that allow a user to connect the particular antenna to radio 110 and/or antenna tuner unit 120. In an exemplary implementation, a user may simply select the antenna of choice, connect the selected antenna via the appropriate connection port and mount the antenna on a metal surface. In some implementations, the antennas may use a magnetic mount so that the antennas can be easily mounted on a vehicle, refrigerator, outdoor air conditioning unit, etc. The device on which the antenna is mounted may then act as a ground plane for the antenna.

Retractable antenna 140 may include an antenna that a user may simply pull out from its case or reel located within TCS 100 to the desired length. In an exemplary implementation, retractable antenna 140 may have a length greater than ten feet, such as 30 feet or more, that provides TCS 100 with communications capability of over one thousand miles. The retractable antenna 140 may be pulled from its reel to the desired length and connected to a pole, tree or other structure via a snap connector. In addition, retractable antenna 140 may be configurable as both a Near Vertical Incident Skywave (NVIS) wave antenna providing high take off angle propagation or as an antenna having a low take off angle. Based on its configuration, retractable antenna 140 may provide the user with some control over the propagation characteristics of the antenna. For example, the retractable antenna 140 may be configured as an NVIS antenna for local to intermediate distance HF communications (e.g., 30-500 miles), while retractable antenna 140 may be configured with a low take off angle mounting for long distance communications (e.g., greater than 500 miles).

In addition, as described in detail below, retractable antenna 140 may include a mechanism for allowing the antenna to be easily extracted from TCS 100 and also allow for easily retracting the antenna. For example, in one implementation, retractable antenna 140 may include a wire (e.g., a 16 gauge wire, an 18 gauge wire, a 20 gauge wire, etc.) with a jacket that is wound onto a coil, spool, reel or other cylinder-like mechanism that may rotate. When the user wishes to use retractable antenna 140, the user simply pulls a connector located on the end of the antenna to unwind the wire/antenna from the coil, spool or reel. In addition, TCS 100 may include a mechanism located, for example, on an external surface of TCS 100 for simply rewinding the antenna via the push of a button, as described in detail below. It should also be noted that in some implementations, a dedicated NVIS antenna package may be incorporated into TCS 100, as opposed to using retractable antenna 140 for NVIS capability, as described in more detail below.

Power supply 150, also referred to herein as battery 150, may include one or more batteries. For example, power supply 150 may include one or more lithium ion phosphate batteries, or different type that provide power to components of TCS 100. In one implementation, battery 150 may provide 60 amp hours of power to TCS 100. This may correspond to approximately 24-48 hours of use of TCS 100 without the need to recharge battery 150. It should be understood that in other implementations, battery 150 may provide other amounts of power (e.g., amp hours) to TCS 100.

SPU 160 may include components for generating power independently from a conventional power grid. For example, in one implementation, PSU 160 may include one or more "soft roll" or foldable solar panels, a solar charge controller and monitoring hardware for monitoring generation of electrical power via solar cells included in the solar panels. In an exemplary implementation, SPU 160 may include two solar panels capable of generating adequate power to charge battery 150 such that TCS 100 may run continuously without connection to a conventional power grid. That is, SPU 160 may charge battery 150 to ensure that TCS 100 may be used for extended periods (e.g., weeks, months or longer periods) without access to a commercial power grid, a generator or other power sources. Providing TCS 100 with an independent power source, that is included within TCS 100, enables TCS 100 to be used in situations where the commercial power grid is damaged and/or unavailable for an extended period of time.

Power interface 170 may include a connection interface for connecting TCS 100 to a commercial power supply. For example, power interface 170 may include a connection/plug for allowing TCS 100 to be plugged into a conventional receptacle providing alternating current (AC) power (e.g., 120 volts AC). Power interface 170 may also include a switching power supply that includes a charge controller, power inverter and/or charger that charge battery 150 and/or powers components of TCS 100 (e.g., radio 110, ATU 120, etc.) while TCS 100 is connected to a conventional power source that provides, for example, 120 volts AC. In some implementations, power interface 170 may also include other power adapters, such as cigarette lighter-type adapters, that connect power interface 170 to a power source.

As described briefly above, TCS 100 may include an EMP shielded case used to protect the components of TCS 100 from EMP attacks or surges. For example, FIG. 2A illustrates a front view of an exemplary case 200 (also referred to herein as box 200 or container 200) used to house components of TCS 100. Referring to FIG. 2A, case 200 may include a conductive material that forms a Faraday shield to protect components of TCS 100 from electromagnetic radiation. For example, in one implementation, case 200 may be formed from aluminum, such as bonded aluminum. In other implementations, case 200 may be formed of steel, sheet metal, or some other conductive material. In each situation, case 200 may protect the components of TCS 100 from externally generated electromagnetic radiation, such as electromagnetic radiation cause by EMP. For example, an EMP attack may cause damage to silicon-based components, such as components of radio 110, antenna tuner unit 120, SPU 160, etc. By forming case 200 to act as a Faraday shield around the components of TCS 100, the components are protected from an EMP attack.

Referring back to FIG. 2A, case 200 may include door 210, latching mechanism 220 and handle 230. Door 210 may be opened to allow a user to access components of TCS 100 (e.g., radio 110, antenna tuner unit 120, etc.). Latching mechanism 220 may include a lock or other latching mechanism used to secure door 210 in the closed position when not in use. Handle 230 may be used to aid in moving TCS 100. In an exemplary implementation, the width of case 200, illustrated as "W" in FIG. 2A may be approximately 24 inches and the height of case 200, illustrated as "H" in FIG. 2A may be approximately 19 inches. It should be understood that case 200 may have different sizes based on the particular components included in TCS 100.

FIG. 2B illustrates a side view of case 200. Referring to FIG. 2B, case may include wheels 240 mounted to the rear portion of case 200 and a rack assembly 250 mounted in the front portion of case 200. Wheels 240 may allow case 200 to be easily rolled to various locations. Rack assembly 250 may support radio 110, antenna tuner unit 120, various meters associated with monitoring power supply 150 and SPU 160, and other components associated with TCS 100. Case 200 may also include handles 260 located on either side of case 260 to facilitate moving case 200. In an exemplary implementation, the depth of case 200, illustrated as "D" in FIG. 2B, may be approximately 19 inches. It should be understood that case 200 may have other depths based on the particular components included in TCS 100. Door 210 may include a gasket or seal 212 formed around the perimeter of door 210 to ensure that TCS 100 is protected from the elements (e.g., is watertight). In addition, door 210 may include a continuous conductive gasket 214 (also referred to herein as electromagnetic shielding gasket 214) formed adjacent gasket 212 to ensure that case 200 forms an electrically continuous Faraday type shield when case 200 is closed, as described in more detail below.

Figure 2C:
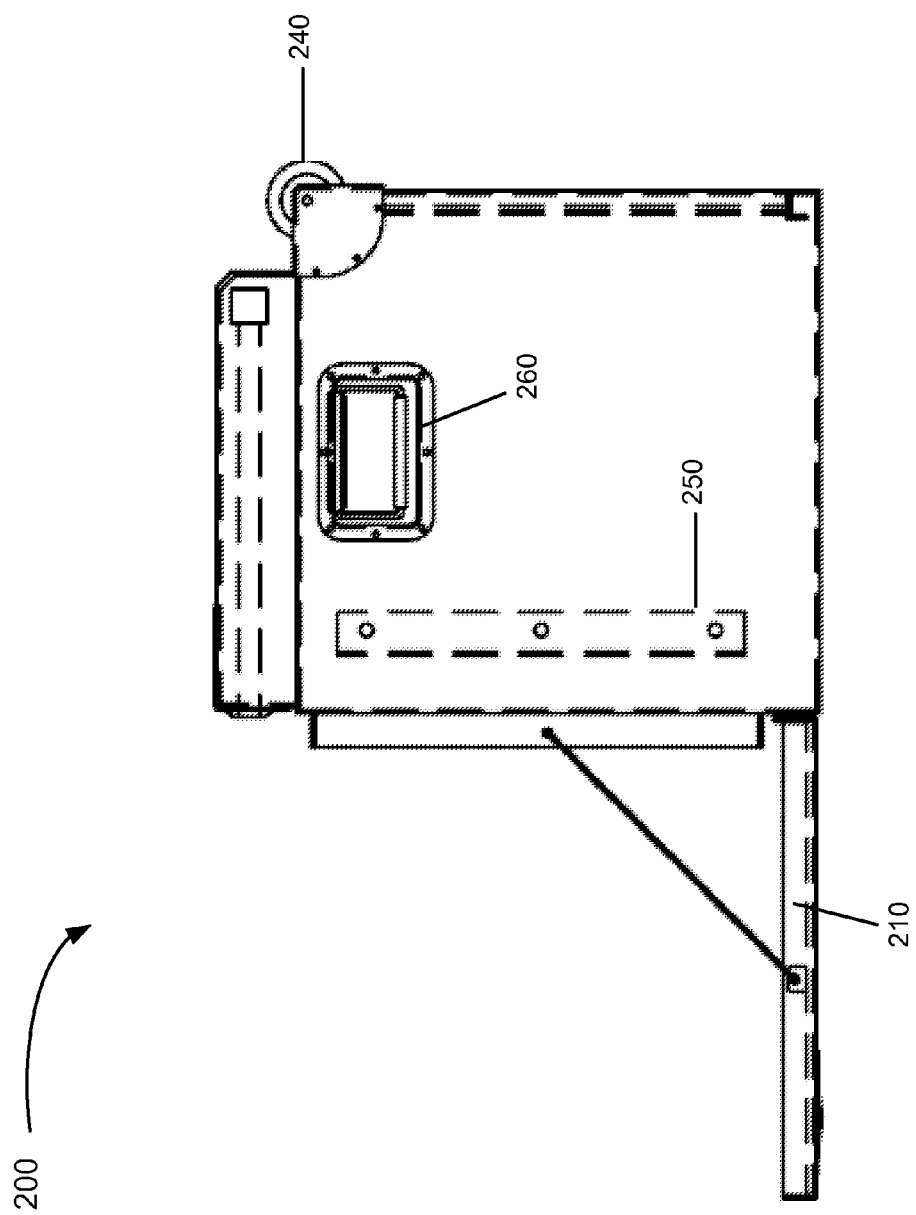

FIG. 2C illustrates a side view of case 200 with door 210 in the open position. As illustrated, door 210 may open and provide a user with access to internal components of TCS 100. In addition, the opened door 210 may provide the user with a relatively flat work space while door 210 is in the open position. This work space may be used to place a computer or other equipment that may be used in connection with TCS 100.

Figure 2D:
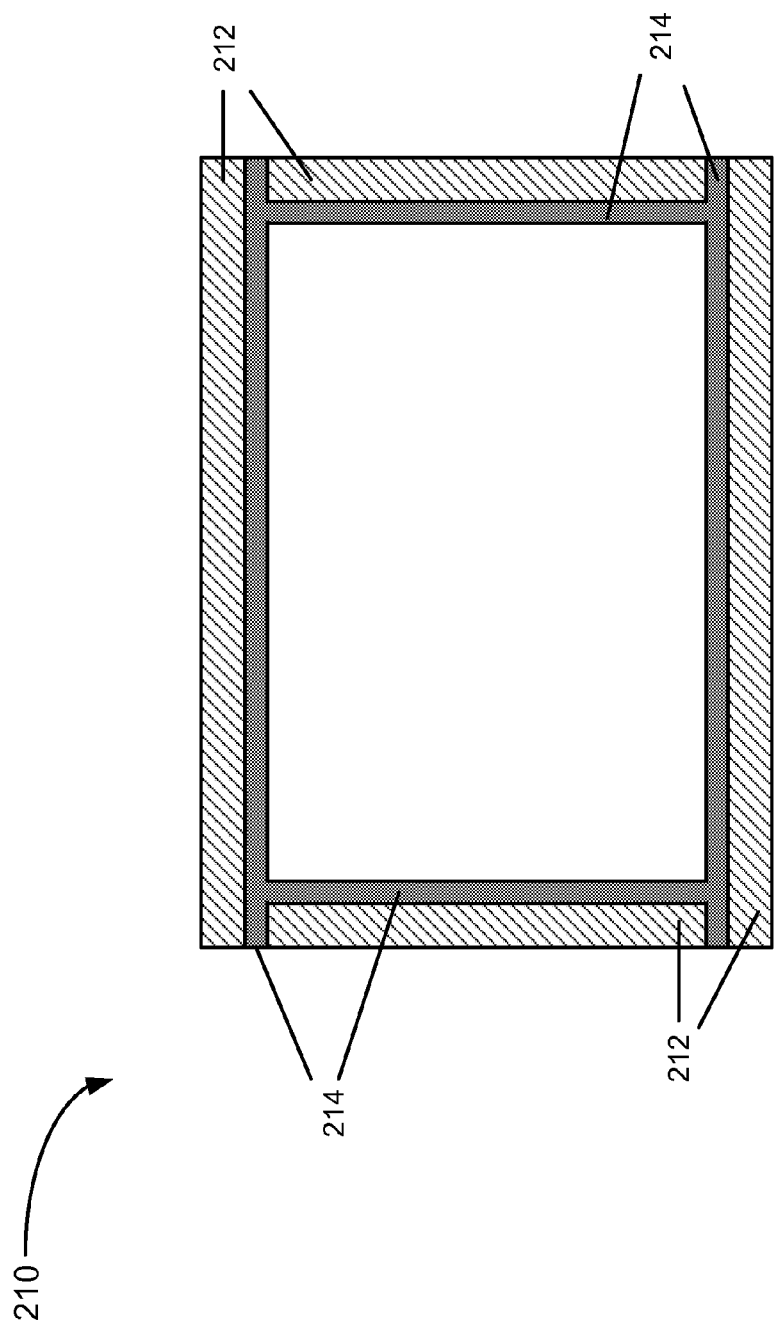

As described above, door 210 may include a gasket/seal 212 around the perimeter of door 210 and an electromagnetic shielding gasket 214 formed adjacent gasket 212 to ensure that case 200 forms an electrically continuous Faraday type shield when case 200 is closed. For example, FIG. 2D illustrates a view of the inside portion of door 210. Referring to FIG. 2D, gasket 212 may be formed around the perimeter of door 210 to act as a weatherproof seal. In an exemplary implementation, gasket 212 may be formed of plastic, rubber or another elastomeric material. Electromagnetic shielding gasket 214 may include a contiguous conductive material formed adjacent gasket 212. As illustrated, electromagnetic shielding gasket 214 may contact the side portions of door 210. In an exemplary implementation, electromagnetic shielding gasket 214 may be formed from multi-fiber aluminum wire and may act to ensure that case 200 forms a Faraday shield when door 210 is closed. Other conductive materials may also be used for electromagnetic shielding gasket 214. In other implementations, gasket 212 may include a plastic or elastomeric member impregnated or injected with conductive particles. In such implementations, a separate electromagnetic shielding gasket 214 may not be needed. That is, gasket 212 may function as both a weatherproofing gasket and an electromagnetic shielding gasket.

Figure 2E:
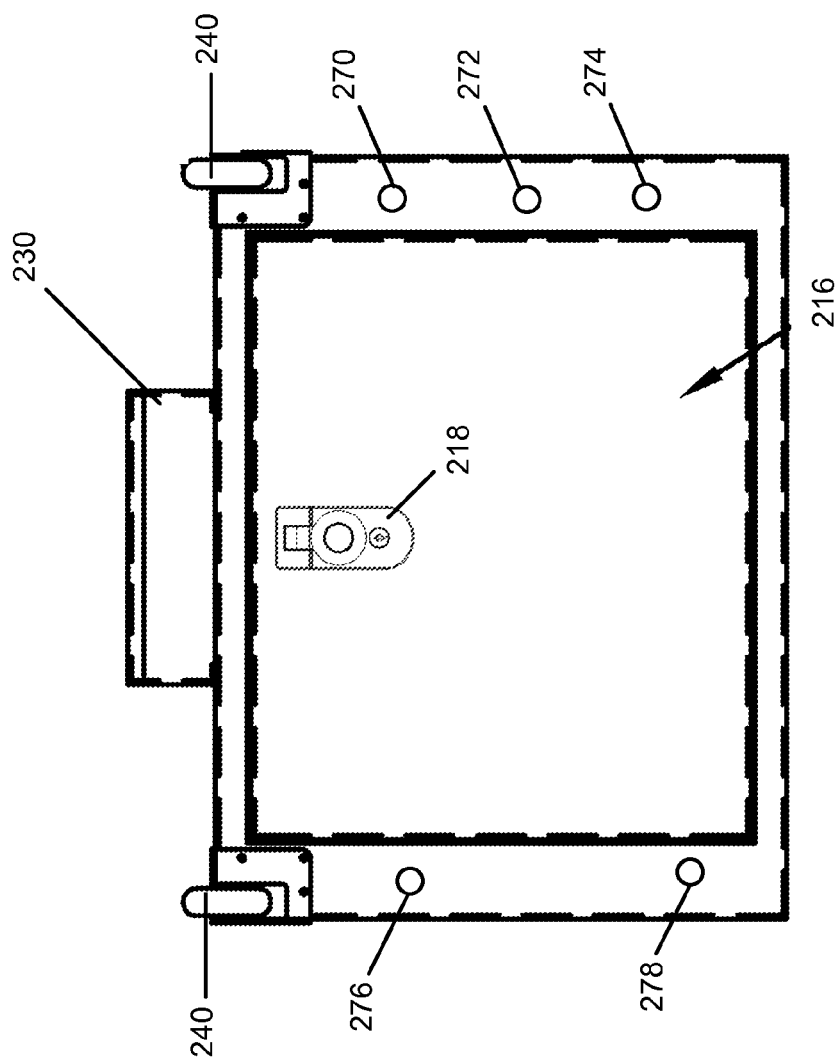

FIG. 2E illustrates a back view of case 200. Referring to FIG. 2E, case 200 may include connection ports 270, 274 and 276, button 272 and ground connection 278 located on the side areas of the back of case 200. In an exemplary implementation, connection port 270 may include a port or opening on case 200 for allowing retractable antenna 140 (located inside case 200) to be extended outside of case 200. For example, connection port 270 may include a connector coupled to the end of releasable antenna 140 that allows a user to simply pull the connector and unwind releasable antenna 140, as described in more detail below. Button 272 may include a push-button type device that functions to release a spring-loaded mechanism to retract the retractable antenna 140 onto the reel/spool on which releasable antenna 140 is stored, as described in more detail below.

Connection port 274 may include a connector (e.g., a PL259 connector or N type connector) for connecting an external HF antenna to radio 110 and/or ATU 120. Similarly, connection port 276 may include a connector (e.g., a PL259 connector or N type connector) for connecting an external VHF/UHF antenna to radio 110 and/or ATU 120. In an exemplary implementation, connection port 278 may be a ground connection (e.g., a conductive bolt or lug) for electrically grounding case 200 to a ground point. The ground connection may be used for electrical safety. In addition, in some implementations the ground connection may function as a counterpoise for an HF antenna. Each of connection ports 270, 274, 276, 278 and button 272 may include conductive caps, such as threaded caps, that cover connection ports 270, 274, 276 and 278 and button 272 when, for example, TCS 100 is not being used. In this manner, openings in case 200 at ports/buttons 270, 272, 274, 276 and 278 are effectively electrically continuous with case 200 (e.g., the Faraday shield) when the connector ports/button are covered. As a result, the internal components of case 200 are protected from electromagnetic radiation caused by, for example, an EMP. This contiguous and electrically continuous shielding provides electrical bonding that enables case 200 to protect electronic components, such as silicon-based electronics, from damage caused by EMP.

Case 200 also includes back door 216 and latch 218. Similar to front door 210, back door 216 may include a gasket similar to gasket 212 and an electromagnetic shielding gasket similar to electromagnetic shielding gasket 214 to maintain electrical bonding and the Faraday shield when case 200 is closed. Door 216 may also include a latching mechanism 218 to ensure that door 280 remains closed until the user wishes to access the components of TCS 100.

Figure 2F:
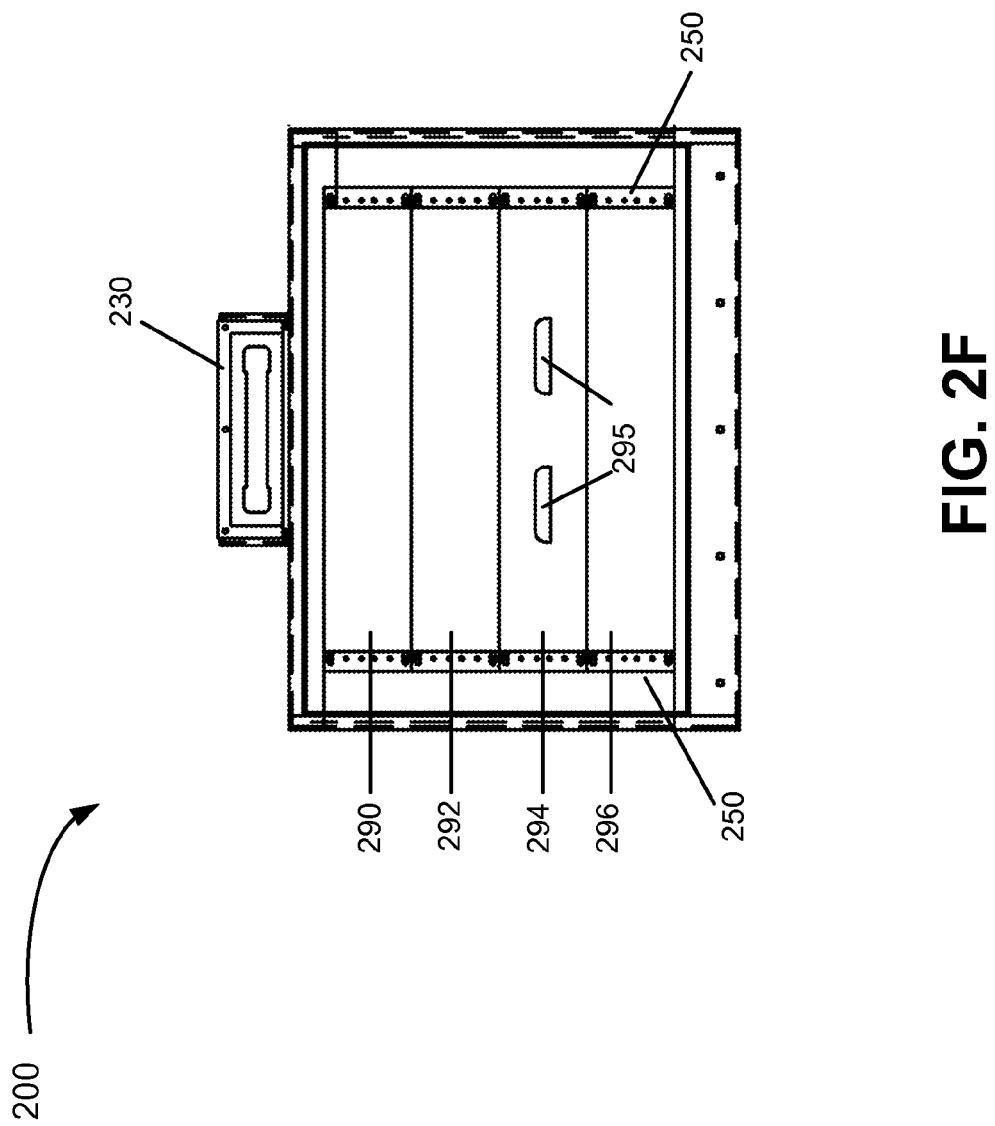

As also discussed above, TCS 100 may include a rack assembly 250 to support radio 110, antenna tuner unit 120 and controls associated with SPU 160. In an exemplary implementation, one or more mounting plates may be mounted to rack assembly 250. For example, FIG. 2F illustrates the front of case 200 with door 210 open/not shown. Referring to FIG. 2F, in this implementation, four rack mounted panels 290, 292, 294 and 296 may be mounted to rack assembly 250. These panels may include pre-punched knock outs for accepting various components of TCS 100, such as radio 110, ATU 120, meters, etc. In FIG. 2F, panel 294 may include two louvers 295 that aid in cooling components of case 200.

Figure 2G:
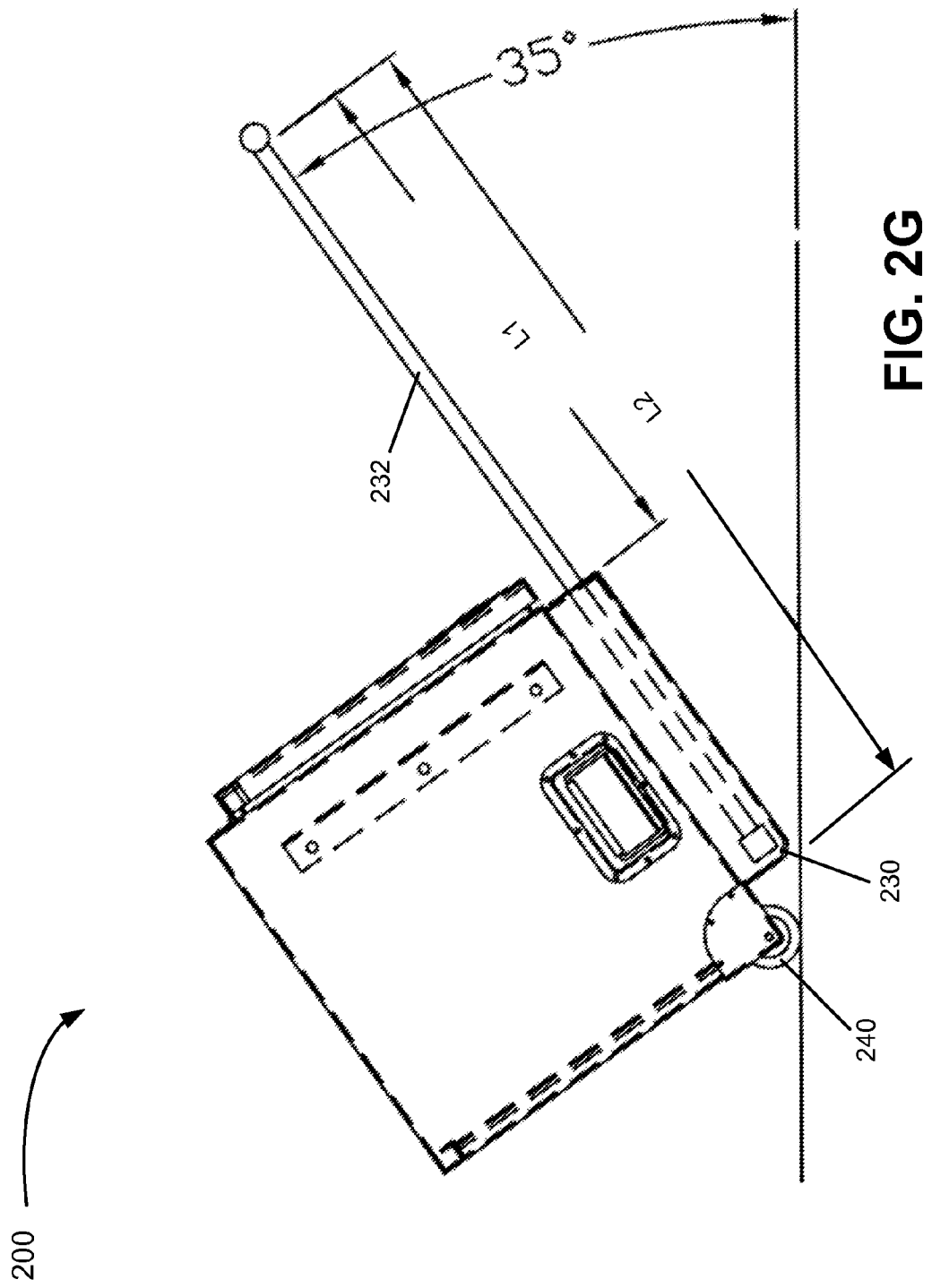

As described previously, case 200 may include a handle 230 to aid in moving case 200. In an exemplary implementation, handle 230 may include a telescoping component that further assists the user in moving case 200. For example, FIG. 2G illustrates case 200 with telescoping member 232 in the extended position. Referring to FIG. 2G, telescoping member 232 extends from case 200 by a distance labeled L1. In an exemplary implementation, L1 may be approximately 29 inches. In addition, the distance labeled L2 in FIG. 2G may be approximately 39 inches. Telescoping member 232 permits case 200 to be easily wheeled by a user at a comfortable position/angle (e.g., a 35 degree angle) with respect the ground or floor.

Figure 3:
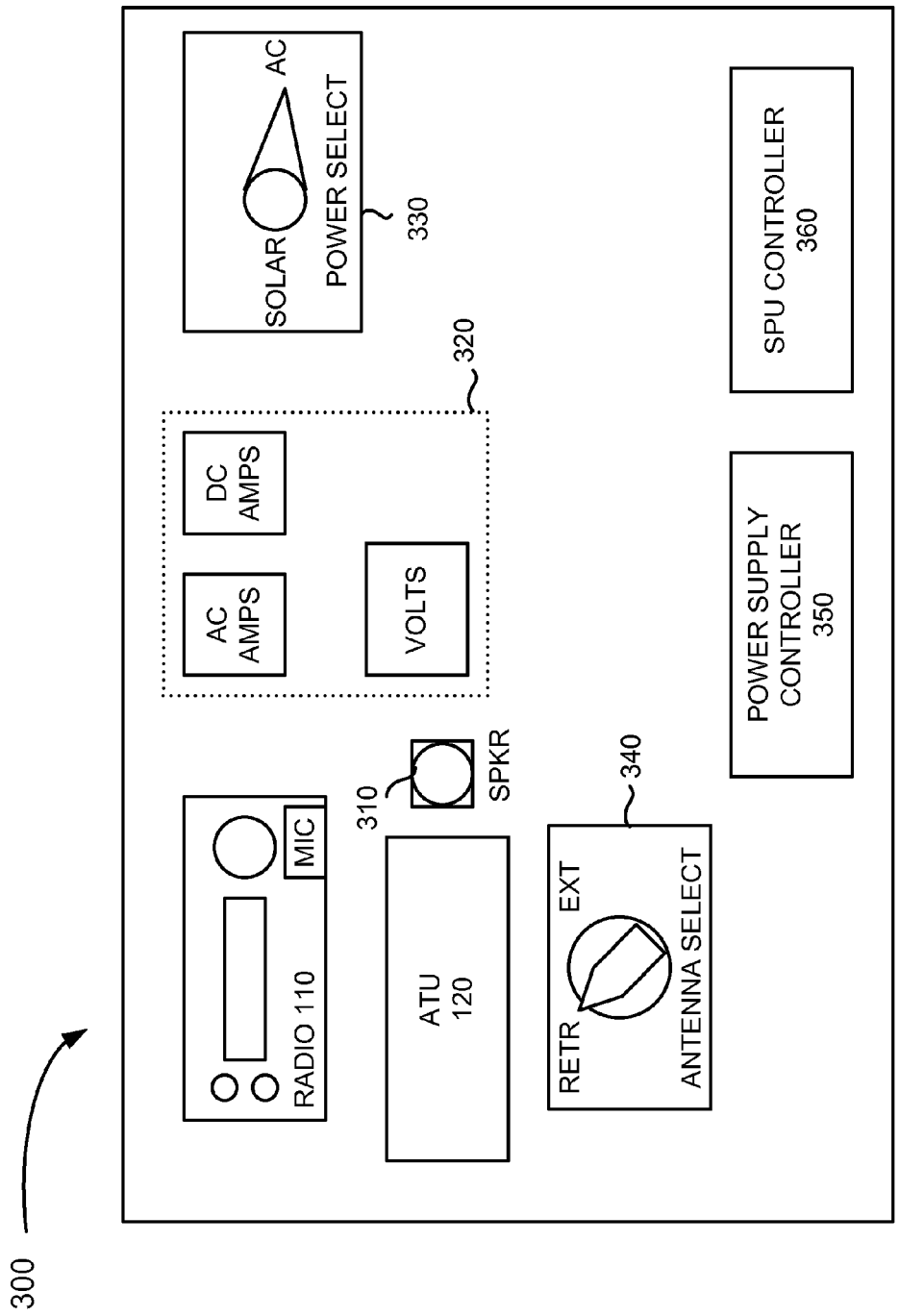
FIG. 3 illustrates a configuration of some of the components of the system of FIG. 1 mounted in a container/case according to an exemplary implementation.

As described above with respect to FIG. 2F, case 200 may include a rack assembly 250 that includes panels with openings to mount various components of TCS 100. For example, FIG. 3 illustrates the front side of case 200 with components mounted in panels 290, 292, 294 and 296, collectively labeled in FIG. 3 and referred to herein as panel 300. Referring to FIG. 3, radio 110 and ATU 120 may be mounted in panel 300. Radio 110 may include a microphone (labeled MIC) in FIG. 3. A speaker 310 associated with radio 110 may also be mounted in panel 300. Alternatively, speaker 310 may be integral with the body of radio 110.

AC/DC meters, located within the dotted area labeled 320 in FIG. 3, that monitor AC amps, DC amps and AC/DC volts associated with operation of TCS 100 may also be mounted in panel 300. These meters may allow a user to determine the operating condition of power supply 150 and SPU 160.

Panel 300 may also include a power select component 330 with a knob/selector for allowing a user to easily select whether TCS 100 will run off of AC power from, for example, a conventional power outlet, or via solar power associated with SPU 160. Panel 300 may further include an antenna select component 340 with a knob/selector for allowing the user to easily select between using retractable antenna 140 and one of the HF/VHF/UHF antennas.

Panel 300 may further include a power supply controller 350 and an SPU controller 360. Power supply controller 350 may be associated with power interface 170 and may control switching between AC and DC power (e.g., battery power). For example, power supply controller 350 may include a charge controller, power inverter and/or and charger for allowing TCS 100 to operate using a conventional, commercial power source when such a source is readily available. SPU controller 360 may be associated with SPU 160. For example, SPU controller 360 may control and/or monitor operations of solar panels included in SPU 160 that are associated with charging battery 150 via the solar panels. A user of TCS 100 may open door 210 to expose components of TCS 100 to allow a user to transmit and receive communications, as described in more detail below.

Figure 4:
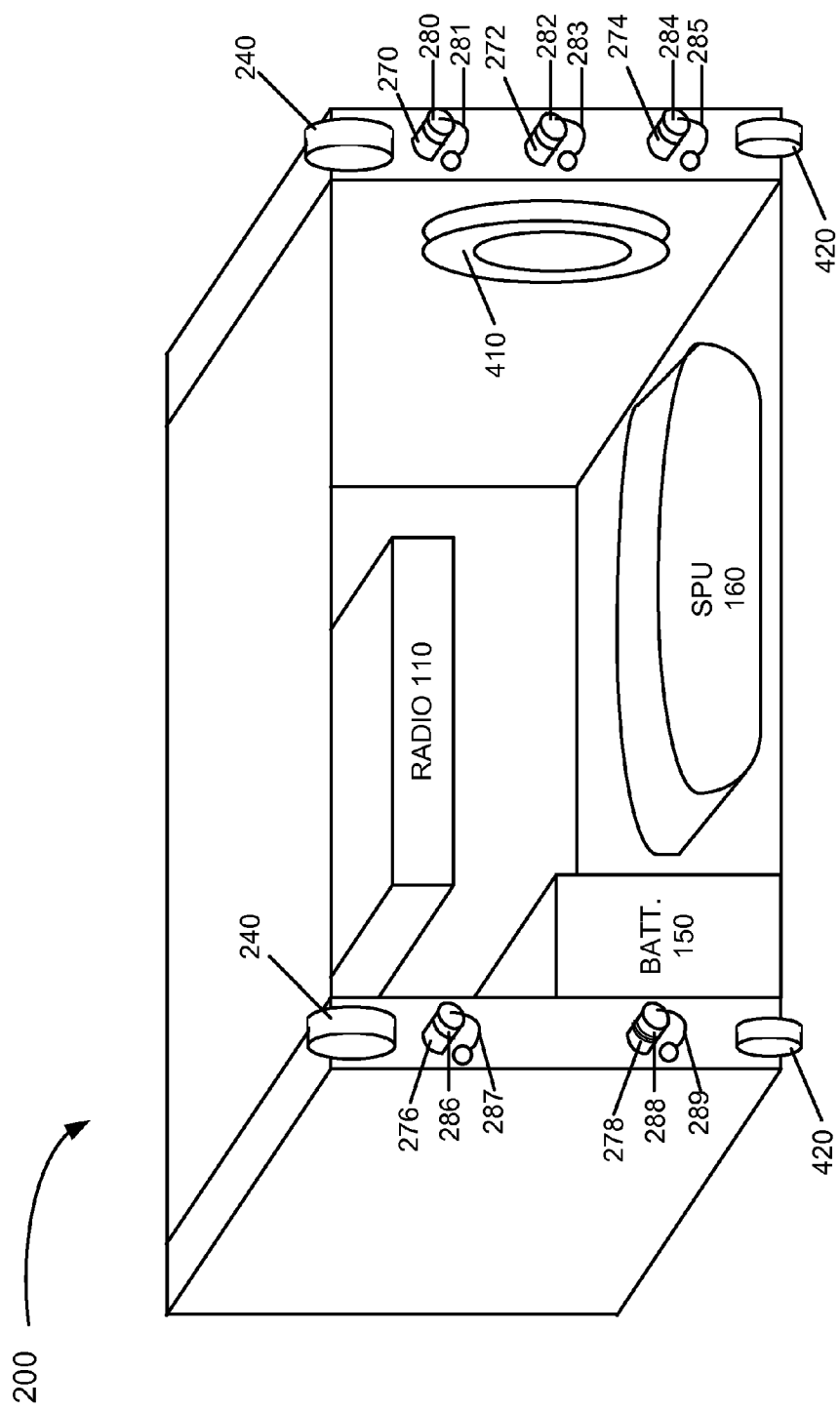
FIG. 4 is an isometric view illustrating some of the components housed within a container/case according to an exemplary implementation.

FIG. 4 is an isometric view of a portion of components included in case 200. Referring to FIG. 4, the rear view of case 200 is shown with back door 216 in the open position/not shown. As illustrated, radio 110, battery 150 and SPU 160 are shown within case 200. As discussed previously, battery 150 may be a lithium ion phosphate battery. In an exemplary implementation, battery 150 is very small and relatively lightweight, thereby enabling case 200 to be smaller and lighter, as compared to using a lead acid battery. However, in some implementations, a lead acid or other type of battery may be used. In either case, case 200 may include a support structure configured to secure battery 150 within case 200.

As also discussed previously, SPU 160 may include soft rolled or foldable solar panels that include solar cells. The solar panels of SPU 160 may be unrolled or unfolded outside of case 200 to allow the solar panels to convert solar energy to charge battery 150. As also illustrated, SPU 160 takes up a relatively small amount of space within case 200.

As previously discussed, connection ports 270, 274, 276 and 278 and button 272 may include conductive caps to cover these components when TCS 100 is not in use. For example, referring to FIG. 4, a cap 280 is illustrated as covering connection port 270. Cap 280 may be threaded to screw onto connection port 270. Cap 280 may also be connected to case 200 via a metallic chain or link labeled 281 in FIG. 4. Similarly, cap 282 may be threaded to screw onto and cover button 272. Cap 282 may also be connected to case 200 via chain 283. Cap 284 may be threaded to screw onto connection port 274 and may be connected to case 200 via chain 285. Cap 286 may be threaded to screw onto connection port 276 and may be connected to case 200 via chain 287. Cap 288 may be threaded to screw onto ground connection 278 and may connected to case 200 via chain 289. In some implementations ground connection 278 may not be needed. In such instances, cap 288 and chain 289 may also not be needed. In either case, these caps allow case 200 to form an electrically seamless Faraday shield and protect the components housed within case 200 from electromagnetic radiation, including an EMP. Chains 281, 283, 285, 287 and 289 help ensure that their corresponding caps are not lost.

When TCS 100 is not in use, or when particular components of TCS 100 are not in use, the threaded caps may be screwed onto its corresponding connection port or button. As discussed previously, when the caps are covering the connection ports and button, this forms a continuous electrical bond and case 200 forms a Faraday shield to protect internal components of TCS 100 from EMP or electromagnetic damage.

As also discussed previously, retractable antenna 140 may include a reel or spool on which the retractable antenna 140 is stored/wound when not in use. For example, referring to FIG. 4, retractable antenna 140 may be stored/wound on reel or spool 410 when the antenna is not being used. Reel 410 may be coupled to connection port 270. A user may then pull a connector located on the end of the antenna 140 from outside case 200 and the retractable antenna 140 unwinds from reel 410. The user may also press button 272 to rewind releasable antenna 140 back onto reel 410. For example, in one implementation, reel 410 may include a spring loaded mechanism that allows the antenna to be simply retracted via pressing button 272. Such a mechanism operates in a manner similar to mechanisms used in various equipment (e.g., a vacuum cleaner, a hair dryer or other equipment). Therefore, by simply pressing button 272, the retractable antenna 140 is rewound or recoiled back onto reel 410 without consuming any power.

Case 200 may also include wheels 420 located on the lower portion of case 200. Wheels 420 may allow the user to easily move case 200. Wheels 420, in addition to wheels 240, allow case 200 to be easily transported.

Figure 5:
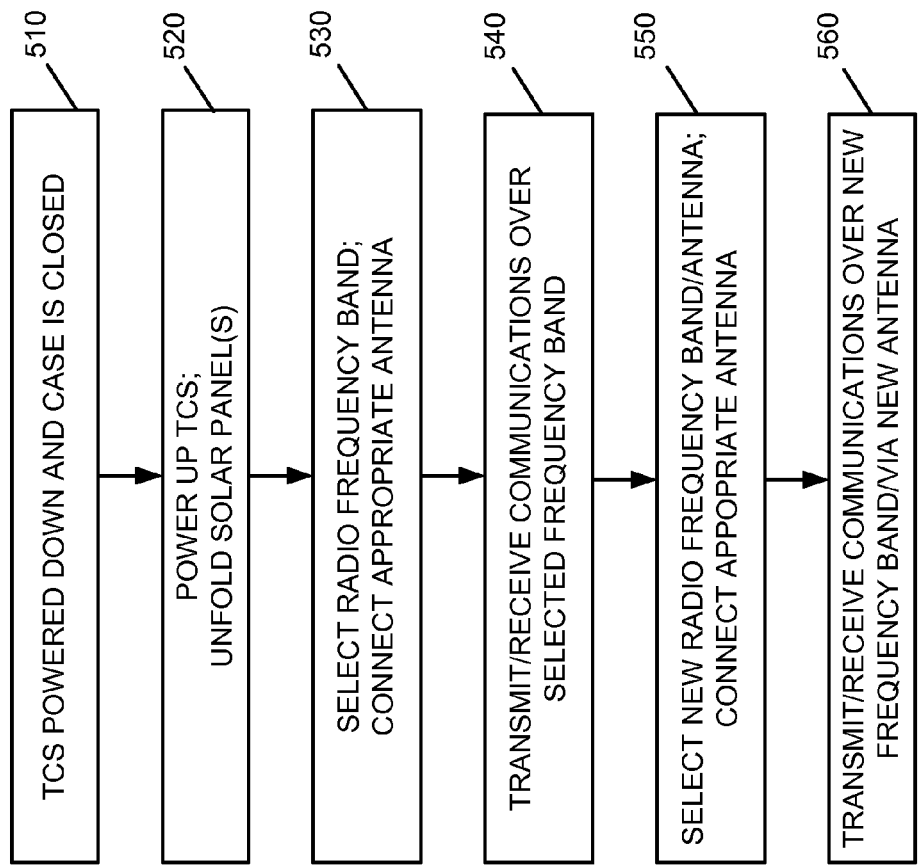
FIG. 5 is a flow diagram illustrating processing associated with use of the system of FIG. 1 in accordance with an exemplary implementation.

As described above, TCS 100 allows a user to establish communications in many different scenarios, including scenarios in which a disaster has occurred. FIG. 5 illustrates exemplary processing associated with use of TCS 100. Processing may begin with TCS 100 being powered down and case 200 in the closed position (act 510). In this scenario, caps 280, 282, 284, 286 and 288 are closed over any connection ports/buttons 270, 272, 274, 276, and 278, respectively.

Now assume that some situation has occurred in which TCS 100 may be needed (e.g., a hurricane, tsunami, electrical blackout, EMP attack, etc.). In this scenario, the user may power up TCS 100 by opening door 210 and turning on radio 110, ATU 120, etc. (act 520). The user may also open the back of case 200 and unfold the solar panels included in SPU 160 and place them in an area that is able to receive sunlight (act 520). Alternatively, if it is nighttime, the user may operate TCS 100 via power from power supply 150 (e.g., the battery).

In either case, the user may select the particular radio band and antenna appropriate for the situation (act 530). For example, assume that the user would like to communicate with another party over a relatively short distance, such as 10-20 miles. In this case, the user may wish to communicate via UHF/VHF and select external antenna via antenna select component 340 (FIG. 3). After the user has selected the particular radio band, the user may connect the antenna corresponding to the selected band to the appropriate connection port (act 530). For example, in this scenario, the user may connect a UHF/VHF antenna to connection port 276. The user may then begin transmitting and receiving communications over the desired frequency band (act 540).

Suppose that the user would like to change frequency bands and/or antennas. For example, suppose that the user would like to communicate with another party located approximately 50 miles away. In this case, the user may change the antenna select component 340 from external to retractable so that retractable antenna 140 may be used (act 550). The user may also unwind retractable antenna 140 from reel 410 to the desired length (e.g., 20 feet) (act 550). The user may also configure retractable antenna 140 for the desired take-off angle. The user may then begin transmitting and receiving communications over the newly selected frequency band and/or via the newly selected antenna (act 560). When the user is finished transmitting/receiving using retractable antenna 140, the user may simply press button 272 to retract the antenna 140.

In this manner, TCS 100 may be used to communicate with other devices over a wide range of distances (e.g., from a few miles to over one thousand miles). In addition, using SPU 160 allows TCS 100 to operate independently without access to commercial power for an extended period of time (e.g., indefinitely).

As discussed above, TCS 100 may be configured in a number of different ways based on the particular user requirements. For example, in some situations, TCS 100 may include a dedicated space or a punch out within panel 300 for agency/ user specific radios or other communications equipment. For example, a government, military, or public safety agency, such as a police or fire department, may desire one of their transceivers to integrate into the TCS 100 to add additional disaster communication capability. In such scenarios, TCS 100 may accommodate this additional customization. In some implementations, TCS 100 may be provided to various users with pre-punched panels that will accommodate user-provided equipment. Such implementations may be useful in situations where the user wishes to provide his/her own equipment for various reasons (e.g., defense situations where the user-provided equipment may be classified, user has already purchased equipment, etc.). In each case, TCS 100 may be provided to support user-defined customization requirements.

TCS 100 may also include additional customization features. For example, in some implementations, TCS 100 may include a command console that may be used to provide additional features that allows the user to expand TCS 100 beyond the communication capabilities described above. For example, a command console may include a computer, server or other processing device that includes hardware and/or control software for linking all the components of TCS 100 into a seamless, complete communications station that allows a user to operate a remote station with full command, control and communications capabilities.

As one example, the command console may include hardware and/or software to perform Automatic Link Establishment (ALE). ALE provides the operator with the capability to establish the best possible communications link by automatically selecting the maximum useable frequency (MUF) for the far end station location and the time of day of the connection. By using ALE, the operator will be provided with the best potential link with the station that they desire to communicate with and also ensure maximum propagation for both ends of the link. In some implementations, the ALE feature may be provided as a feature within the transceiver equipment package (e.g., within radio 110 and/or ATU 120). In other implementations, the ALE may be provided via external software that communicates with the transceiver.

TCS 100 may provide additional options that add to the robustness of TCS 100. For example, in some implementations, TCS 100 may include a satellite communications component or package. For example, a satellite transceiver may be included in TCS 100 that provides the user with an option to communicate with, for example, a Geo Synchronous satellite that orbits at approximately 23,500 miles above the earth. Such satellites are less vulnerable to EMP than Low Earth Orbit (LEO) satellites.

In still other implementations, TCS 100 may include a dedicated NVIS antenna. As described above, retractable antenna 140 may function as an NVIS antenna. However, in some implementations, a user may want to use a dedicated NVIS antenna included within TCS 100. In such implementations, a dedicated NVIS antenna may be included in TCS 100. A dedicated NVIS antenna may provide more predicable or precise NVIS capability/coverage than using retractable antenna 140 as an NVIS antenna.

For example, NVIS is generally used for local to intermediate distance HF communications. The NVIS antenna included in TCS 100 may use a high take-off angle or a near vertical take-off angle so that the reflected signal returns to the earth within a distance of 500 miles or less from the transmitting station (e.g., TCS 100). In this manner, the NVIS antenna included in TCS 100 may be useful to a user that desires more local communications capability from HF. That is, typical HF antennas have low take off angles with the goal being distant communications (1000 miles or greater). Most emergency/disaster communications are more local/regional in nature (less than 300 miles). VHF and UHF communications may be the preferred spectrum in such scenarios. However, VHF and UHF technology provide line of sight capability (e.g., 0-30 miles) due to the curvature of the earth. This distance can be extended by the use of repeaters which receive and retransmit the signal beyond the line of sight. However, since an EMP may disrupt the power grid infrastructure and the repeaters, such repeaters may not be depended upon in a disaster scenario. Therefore, including an NVIS antenna in TCS 100 provides communications for the propagation gap between 30 and 500 miles, such as a distance ranging from approximately 50-300 miles with the NVIS antenna using HF.

As still another option, TCS 100 may include a handheld radio package. The handheld radio package may include one or more complete handheld radios that may be used for tactical field communications. In some implementations, the handheld radio(s) will be specified to meet particular user requirements. For example, the handheld radio(s) may be capable of multi band operation in the VHF/UHF communication spectrum. As described above with other components of TCS 100, these handheld radios may be contained in case 200. Alternatively, these radios may be included in a different EMP protected case with an independent charger unit, coupled with solar charger capability. As still another alternative, these radios may be connected to TCS 100 for charging purposes.

TCS 100 may further include an extended power package (EPP) option. In such implementations, batteries having the capability to run TCS 100 in greater time increments may be provided in addition to battery 150. In such implementations, SPU 160 may provide a proportional increase in solar panels to meet the additional charge/load requirements. Again, as with the other components, the EPP components may be included within case 200. Alternatively, these components may be included in a separate EMP protected case.

In still other implementations, TCS 100 may include a generator option. In such scenarios, a user may desire power for charging TCS 100 components beyond solar capability and may desire 120 volts AC. Many modern generators have silicon based components in their regulator circuitry and starter components. These components may be vulnerable to EMP. In an exemplary implementation, the generator may be housed in an EMP protected case to ensure its availability in the time of need. Typical sizing may range from 1 kilowatt (KW) to 8 KW or more depending on the user's requirements.

Implementations described herein provide a robust communications system that may be used to provide communications between parties when various infrastructure components are not available. For example, a user with TCS 100 may communicate with another user having a similar TCS 100 or with another party located in an area where the communications infrastructure and/or power grid is operating normally. In each case, TCS 100 allows a user to maintain communications during disaster-related scenarios or in other scenarios. In addition, TCS 100 may include an EMP protected or hardened case 200 that protects the components of TCS 100 from external electromagnetic radiation, such as electromagnetic radiation caused by an EMP attack. Still further, TCS 100 may provide options for allowing a user to customize a communication solution based on user/agency specific goals.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in implementations described above, case 200 is an EMP hardened case that protects components located inside case 200 from damage that may be caused by external electromagnetic radiation, such as EMP. In the implementations described above, various openings, such as connection ports/buttons 270, 272, 274, 276 and 278 were described as including conductive caps, and front door 210 and back door 216 were described as including conductive gaskets to maintain a seamless electrical bond and maintain the Faraday shield. In other implementations, other types of conductive gaskets, conductive caps or other conductive fittings may be located at all openings, hatches and entry points to case 200 to form a seamless electrical bond and maintain the Faraday shield when case 200 is closed.

In addition, in the implementations described above, case 200 is an EMP hardened case that protects TCS 100 from EMP attacks. In other implementations, case 200 may be any type of durable and/or weather-resistant case, such as a hard shell container/case, that is not electromagnetically shielded.

In addition, implementations have been described above with respect to using a single radio/transceiver with particular antennas/antenna packages. In other implementations, multiple radios may be used with any particular antenna or group of antennas.

Still further, implementations have been described above with respect to using soft-rolled/foldable solar panels that may be unrolled/unfolded to expose the solar cells. In other implementations, other types of solar power generating devices may be used to charge battery 150 and allow TCS 100 to operate independently from a commercial power grid or an external generator.

Still further, while series of acts have been described with respect to FIG. 5, the order of the acts may be varied in other implementations. Moreover, non-dependent acts may be implemented in parallel.

It will be apparent that various features described above may be implemented in many different forms of hardware, software and firmware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A system, comprising:
   a radio configured to transmit and receive communications over a plurality of frequencies;
   a battery configured to supply power to the radio;
   a power generation system configured to charge the battery, wherein the power generation system includes:
      at least one solar panel, and
      a controller configured to charge the battery via the at least one solar panel; and
   a portable electromagnetically shielded container configured to:
      house the radio, the battery, the at least one solar panel and the controller, and
      provide protection to the radio, the battery and the power generation system from electromagnetic radiation related damage caused by electromagnetic radiation originating from a source external to the system,
      wherein the portable electromagnetically shielded container includes:
      four sides, a top and a bottom, wherein each of the four sides, top and bottom are formed from a conductive material and a first one of the four sides acts as a door to allow access to the radio, the battery and the power generation system,
      a conductive gasket formed around the first side wherein the conductive gasket is configured to ensure that the portable electromagnetically shielded container forms part of an electrically continuous Faraday shield when the door is closed,
      a plurality of connection ports located on a second one of the four sides, wherein at least some of the plurality of connection ports are configured to receive a connection to a high frequency antenna, a very high frequency antenna or an ultra high frequency antenna, and
      at least one of conductive caps or conductive fittings configured to cover the plurality of connection ports and to act as part of the electrically continuous Faraday shield when the door is closed.

2. The system of claim 1, further comprising:
   an antenna tuner unit; and
   a retractable antenna,
   wherein the antenna tuner unit and retractable antenna are housed in the portable electromagnetically shielded container.

3. The system of claim 2, further comprising:
   a reel configured to store the retractable antenna when the retractable antenna is not being used, the reel including a spring mechanism configured to rewind the retractable antenna after at least a portion of the retractable antenna is unwound from the reel.

4. The system of claim 3, wherein the system further comprises:
   a button associated with the retractable antenna, wherein the retractable antenna is rewound onto the reel in response to pressing the button.

5. The system of claim 1, wherein the plurality of connection ports include:
   a first connection port for connecting the high frequency antenna, and
   a second connection port for connecting the very high frequency antenna or the ultra high frequency antenna.

6. The system of claim 1, wherein the battery comprises an ion lithium phosphate battery.

7. The system of claim 1, wherein the at least one solar panel is foldable.

8. The system of claim 1, wherein the radio is further configured with automatic link establishment.

9. The system of claim 1, wherein the portable electromagnetically shielded container comprises:
a metal shell, and
conductive gaskets, conductive caps or conductive fittings located at all openings, hatches and entry points to the portable electromagnetically shielded container to form a seamless electrical bond.

10. A system, comprising:
a transceiver configured to transmit and receive communications over a plurality of frequencies;
an antenna tuner unit;
a retractable antenna at least ten feet in length;
a battery configured to supply power to the radio and the antenna tuner unit;
a solar power generation system configured to charge the battery, wherein the solar panel generation system includes at least one solar panel; and
a portable container configured to house the transceiver, the antenna tuner unit, the retractable antenna, the battery and the solar power generation system,
wherein the portable container provides a Faraday shield when the portable container is closed to protect the transceiver, the antenna tuner unit, the retractable antenna, the battery and the solar power generation system from electromagnetic radiation originating from a source external to the system, and
wherein the portable container includes:
a plurality of connection ports located on an outer surface of the portable container, and
at least one of conductive caps or conductive fittings configured to cover the plurality of connection ports and to act as part of the Faraday shield when the portable container is closed.

11. The system of claim 10, further comprising:
a spool configured to store the retractable antenna when the retractable antenna is not being used, the spool including a mechanism configured to rewind the retractable antenna after the retractable antenna is unwound from the spool.

12. The system of claim 11, further comprising:
a button associated with the retractable antenna, wherein the retractable antenna is rewound onto the spool in response to pressing the button.

13. The system of claim 10, wherein the plurality of connection ports comprise:
a first connection port for connecting a high frequency antenna, and
a second connection port for connecting a very high frequency antenna or an ultra high frequency antenna.

14. The system of claim 10, wherein the battery comprises an ion lithium phosphate battery or a lead acid battery.

15. The system of claim 10, wherein the at least one solar panel is configured to be rolled or folded when housed in the portable container and unrolled or unfolded when being used, and
a controller configured to charge the battery via the at least one solar panel.

16. The system of claim 15, wherein the solar power generation system is configured to allow the system to be used independently from a commercial power source.

17. The system of claim 10, wherein the portable container comprises:
a watertight container.

18. The system of claim 10, wherein the portable container comprises:
a conductive outer shell configured to create a Faraday shield when the portable container is closed to protect components of the system from electromagnetic radiation.

19. The system of claim 18, wherein the portable container further comprises:
a front door, the front door including a conductive material located around a perimeter of the front door to maintain electrical continuity with respect to the portable container when the front door is closed, and
a back door, the back door including a conductive material located around a perimeter of the back door to maintain electrical continuity with respect to the portable container when the back door is closed.

20. The system of claim 1, wherein each of the width, height and depth of the portable electromagnetically shielded container is less than 24 inches in size and two of the four sides of the portable electromagnetically shield container include handles to facilitate carrying the system.

21. The system of claim 10, wherein each of the width, height and depth of the portable container is less than 24 inches in size.

* * * * *